(12) United States Patent
Iyer et al.

(10) Patent No.: US 9,019,911 B2
(45) Date of Patent: Apr. 28, 2015

(54) SYSTEM AND METHOD FOR CENTRALIZED STATION MANAGEMENT

(75) Inventors: Pradeep J. Iyer, Cupertino, CA (US); Partha Narasimhan, Santa Clara, CA (US); Merwyn Andrade, San Jose, CA (US); John Taylor, Tiburon, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

(21) Appl. No.: 13/460,813

(22) Filed: Apr. 30, 2012

(65) Prior Publication Data

US 2012/0213159 A1     Aug. 23, 2012

Related U.S. Application Data

(60) Continuation of application No. 13/168,789, filed on Jun. 24, 2011, which is a division of application No. 10/806,601, filed on Mar. 23, 2004, now Pat. No. 7,969,937.

(51) Int. Cl.

| | |
|---|---|
| H04W 4/00 | (2009.01) |
| H04B 7/00 | (2006.01) |
| H04L 29/06 | (2006.01) |
| H04W 12/06 | (2009.01) |
| H04W 28/08 | (2009.01) |
| H04W 84/12 | (2009.01) |
| H04W 24/08 | (2009.01) |

(52) U.S. Cl.
CPC ........ *H04L 63/1441* (2013.01); *H04L 63/1466* (2013.01); *H04W 12/06* (2013.01); *H04W 24/08* (2013.01); *H04W 84/12* (2013.01)

(58) Field of Classification Search
USPC .............. 370/310, 328, 329, 338, 310.2, 252, 370/277, 311, 312, 336; 455/450, 452.1, 455/452.2, 456.2, 509
See application file for complete search history.

(56) References Cited

U.S. PATENT DOCUMENTS

| | | | |
|---|---|---|---|
| 5,193,101 | A | 3/1993 | McDonald et al. |
| 5,212,806 | A | 5/1993 | Natarajan |
| 5,428,816 | A | 6/1995 | Barnett et al. |
| 5,509,051 | A | 4/1996 | Barnett et al. |
| 5,570,366 | A | 10/1996 | Baker et al. |
| 5,640,677 | A | 6/1997 | Karlsson |
| 5,673,307 | A | 9/1997 | Holland et al. |
| 5,878,119 | A | 3/1999 | Chellali et al. |
| 5,878,328 | A | 3/1999 | Chawla et al. |

(Continued)

OTHER PUBLICATIONS

U.S. Appl. No. 10/806,601, Non-Final Office Action, mailed Aug. 8, 2007.

(Continued)

*Primary Examiner* — Benjamin H Elliott, IV
*Assistant Examiner* — Eric Nowlin
(74) *Attorney, Agent, or Firm* — Ying Wang

(57) ABSTRACT

A wireless network is adapted with a wireless network switch in communication with a plurality of access points, which are in communication with one or more stations. Specifically, a network device may receive a plurality of request messages on a plurality of wireless communication channels through a plurality of access points. The request messages are originated from a single station. Furthermore, the network can extract a plurality of channel identifiers from the request messages, and generates a filtered radio frequency neighborhood list dynamically based on the extracted channel identifiers.

21 Claims, 10 Drawing Sheets

(56) References Cited

U.S. PATENT DOCUMENTS

| | | | |
|---|---|---|---|
| 5,991,287 A | 11/1999 | Diepstraten et al. | |
| 6,038,444 A | 3/2000 | Schipper et al. | |
| 6,560,442 B1 | 5/2003 | Yost et al. | |
| 6,675,208 B1 | 1/2004 | Rai et al. | |
| 6,697,337 B1* | 2/2004 | Cafarelli et al. | 370/253 |
| 6,842,726 B1 | 1/2005 | Scharosch et al. | |
| 6,973,053 B1 | 12/2005 | Passman et al. | |
| 7,016,948 B1* | 3/2006 | Yildiz | 709/221 |
| 7,031,336 B2 | 4/2006 | Scherzer et al. | |
| 7,042,865 B1 | 5/2006 | Meier et al. | |
| 7,075,904 B1 | 7/2006 | Manish et al. | |
| 7,079,850 B2 | 7/2006 | Cameron | |
| 7,113,498 B2* | 9/2006 | Bajic | 370/338 |
| 7,116,980 B2 | 10/2006 | Bigler et al. | |
| 7,293,088 B2 | 11/2007 | Douglas et al. | |
| 7,301,926 B1 | 11/2007 | Dietrich et al. | |
| 7,313,113 B1 | 12/2007 | Hills et al. | |
| 7,330,472 B2 | 2/2008 | Kowalski | |
| 7,336,670 B1* | 2/2008 | Calhoun et al. | 370/401 |
| 7,406,319 B2 | 7/2008 | Kostic et al. | |
| 7,424,268 B2* | 9/2008 | Diener et al. | 455/62 |
| 7,453,840 B1* | 11/2008 | Dietrich et al. | 370/328 |
| 7,471,629 B2 | 12/2008 | Melpignano | |
| 7,489,648 B2 | 2/2009 | Griswold | |
| 7,499,718 B2 | 3/2009 | Stephenson et al. | |
| 7,689,210 B1 | 3/2010 | Bims | |
| 7,957,742 B2 | 6/2011 | Kostic et al. | |
| 7,969,937 B2 | 6/2011 | Iyer et al. | |
| 7,969,950 B2* | 6/2011 | Iyer et al. | 370/338 |
| 8,191,144 B2* | 5/2012 | Cam Winget et al. | 726/23 |
| 2001/0018346 A1* | 8/2001 | Okajima et al. | 455/437 |
| 2002/0159544 A1 | 10/2002 | Karaoguz | |
| 2002/0181418 A1* | 12/2002 | Awater et al. | 370/329 |
| 2003/0039232 A1 | 2/2003 | Casati et al. | |
| 2003/0145092 A1 | 7/2003 | Funato et al. | |
| 2003/0199283 A1* | 10/2003 | Busch | 455/513 |
| 2003/0227893 A1 | 12/2003 | Bajic | |
| 2004/0037247 A1 | 2/2004 | Ngo | |
| 2004/0039817 A1* | 2/2004 | Lee et al. | 709/225 |
| 2004/0042609 A1 | 3/2004 | Delaney et al. | |
| 2004/0063427 A1 | 4/2004 | Narasimha et al. | |
| 2004/0063455 A1* | 4/2004 | Eran et al. | 455/525 |
| 2004/0068668 A1 | 4/2004 | Lor et al. | |
| 2004/0102192 A1* | 5/2004 | Serceki | 455/434 |
| 2004/0156336 A1 | 8/2004 | McFarland et al. | |
| 2004/0185852 A1* | 9/2004 | Son et al. | 455/438 |
| 2004/0224690 A1* | 11/2004 | Choi et al. | 455/436 |
| 2004/0243846 A1* | 12/2004 | Aboba et al. | 713/201 |
| 2005/0003827 A1 | 1/2005 | Whelan | |
| 2005/0047371 A1* | 3/2005 | Bennett | 370/331 |
| 2005/0059353 A1* | 3/2005 | Smith et al. | 455/67.11 |
| 2005/0068925 A1 | 3/2005 | Palm et al. | |
| 2005/0070275 A1 | 3/2005 | Jeyaseelan et al. | |
| 2005/0073979 A1* | 4/2005 | Barber et al. | 370/338 |
| 2005/0075142 A1* | 4/2005 | Hoffmann et al. | 455/562.1 |
| 2005/0083210 A1 | 4/2005 | Shuey et al. | |
| 2005/0085259 A1 | 4/2005 | Conner et al. | |
| 2005/0086465 A1* | 4/2005 | Sapkota et al. | 713/150 |
| 2005/0090259 A1 | 4/2005 | Jain et al. | |
| 2005/0119001 A1* | 6/2005 | Watanabe | 455/436 |
| 2005/0128988 A1* | 6/2005 | Simpson et al. | 370/338 |
| 2005/0128990 A1* | 6/2005 | Eom et al. | 370/338 |
| 2005/0135270 A1* | 6/2005 | Larsen et al. | 370/254 |
| 2005/0138178 A1 | 6/2005 | Astarabadi | |
| 2005/0141498 A1 | 6/2005 | Cam Winget et al. | |
| 2005/0157688 A1 | 7/2005 | Rydnell et al. | |
| 2005/0174955 A1 | 8/2005 | Phillips et al. | |
| 2005/0201341 A1 | 9/2005 | Griswold | |
| 2005/0207448 A1* | 9/2005 | Iyer et al. | 370/476 |
| 2005/0213579 A1 | 9/2005 | Iyer et al. | |
| 2005/0227623 A1* | 10/2005 | Su et al. | 455/62 |
| 2005/0245237 A1* | 11/2005 | Adachi et al. | 455/411 |
| 2005/0277426 A1 | 12/2005 | Evans et al. | |
| 2006/0111103 A1* | 5/2006 | Jeong et al. | 455/434 |
| 2006/0116170 A1* | 6/2006 | Brahmbhatt et al. | 455/560 |
| 2006/0200540 A1 | 9/2006 | Morishima et al. | |
| 2007/0025486 A1* | 2/2007 | Gainey et al. | 375/356 |
| 2007/0165537 A1 | 7/2007 | Magnusson et al. | |
| 2008/0031185 A1 | 2/2008 | Bims | |
| 2008/0062942 A1 | 3/2008 | Hills et al. | |
| 2008/0126455 A1 | 5/2008 | Francfort et al. | |
| 2008/0211641 A1 | 9/2008 | Murray et al. | |
| 2008/0259866 A1 | 10/2008 | Kostic et al. | |
| 2009/0253443 A1 | 10/2009 | Bichot | |
| 2011/0038349 A1 | 2/2011 | Sun et al. | |
| 2012/0213159 A1 | 8/2012 | Iyer et al. | |

OTHER PUBLICATIONS

U.S. Appl. No. 10/806,601, Non-Final Office Action, mailed Apr. 8, 2008.

U.S. Appl. No. 10/806,601, Non-Final Office Action, mailed Oct. 17, 2008.

U.S. Appl. No. 10/806,601, Final Office Action, mailed Apr. 14, 2009.

U.S. Appl. No. 10/806,601, Non-Final Office Action, mailed Aug. 31, 2010.

U.S. Appl. No. 10/806,601, Notice of Allowance, mailed Feb. 22, 2011.

* cited by examiner

SYSTEM AND METHOD FOR CENTRALIZED STATION MANAGEMENT

CROSS-REFERENCE TO RELATED APPLICATIONS

This application is a continuation of and claims the benefit of priority on U.S. patent application Ser. No. 13/168,789, filed Jun. 24, 2011, which is a divisional of and claims the benefits of priority to U.S. patent application Ser. No. 10/806,601 (now U.S. Pat. No. 7,969,937), filed Mar. 23, 2004, the entire contents of which are incorporated herein by reference.

FIELD

Embodiments of the invention relate to the field of wireless communications, in particular, to a centralized mechanism for managing operations of and communications within a wireless network.

GENERAL BACKGROUND

Over the last decade or so, businesses have begun to install enterprise networks with one or more local area networks in order to allow their employees to share data and improve work efficiency. To further improve work efficiency, various enhancements have added to local area networks. One enhancement is remote wireless access, which provides an important extension in forming a wireless local area network (WLAN).

A WLAN supports communications between wireless stations (STAs) and Access Points (APs). Normally, each AP independently operates as a relay station by supporting communications between wireless stations of a wireless network and resources of a wired network. Hence, the APs are designed to operate autonomously, with each AP maintaining sufficient intelligence to control its own connections with STAs. As a result, conventional WLANs are subject to a number of disadvantages.

For instance, conventional WLANs are unable to effectively respond to man-in-the-middle attacks, especially where the attacker impersonates an AP by sending deauthentication messages to a targeted STA. Moreover, since each AP is designed to operate autonomously, the network administrator needs to separately configure individual APs, a major undertaking when a large number of APs are required in order to provide complete coverage at a site.

BRIEF DESCRIPTION OF THE DRAWINGS

The invention may best be understood by referring to the following description and accompanying drawings that are used to illustrate embodiments of the invention.

DETAILED DESCRIPTION

Figure 1:
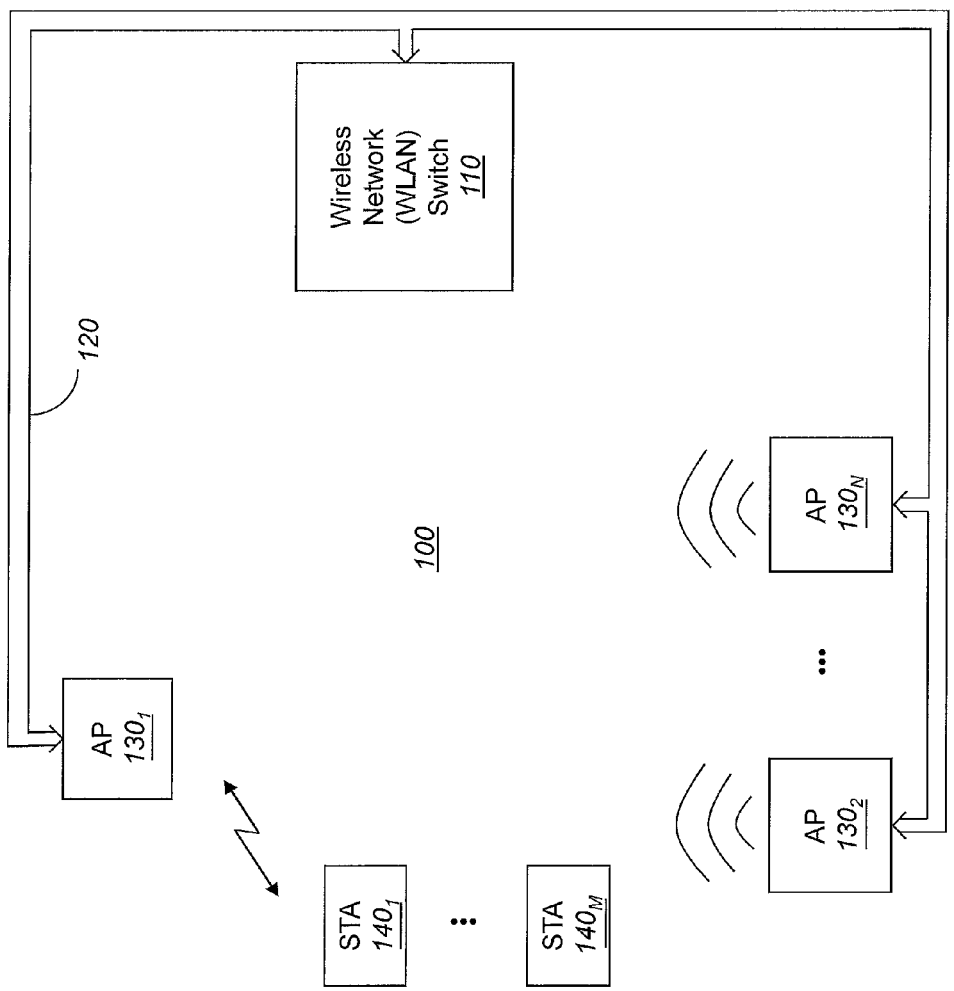
FIG. 1 is an exemplary embodiment of a wireless network in accordance with the invention.

Embodiments of the invention relate to a centralized mechanism for managing operations of and communications within a wireless network. According to one illustrative embodiment, the centralized mechanism may be deployed as station management logic (STM) within a wireless network switch. This logic may be deployed as a software module, executed by a processor, that is configured to handle the processing of a plurality of management messages during an Association phase between a STA and an AP, including but not limited or restricted to one or more of the following: PROBE REQUEST, PROBE RESPONSE, AUTHENTICATION, DEAUTHENTICATION, ASSOCIATION REQUEST, ASSOCIATION RESPONSE, REASSOCIATION REQUEST, REASSOCIATION RESPONSE and DISASSOCATION. Moreover, the station management logic (STM) is configured to provide security protection, load balancing, coverage hole detection, and broadcast/multicast traffic reduction.

Herein, the invention may be applicable to a variety of wireless networks such as a wireless local area network (WLAN) or wireless personal area network (WPAN). The wireless network may be configured in accordance with any wireless communication protocol. Examples of various types of wireless communication protocols include Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GEz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); or an IEEE 802.11g standard entitled ""Wireless LAN Medium Access Control (MAC) and Physical Layer (PHY) specifications: Further Higher Data Rate Extension in the 2.4 GHz Band" (IEEE 802.11g, 2003).

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, "logic" includes hardware and/or software module(s) that are configured to perform one or more functions. For instance, a "processor" is logic that processes information. Examples of a processor include a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

An "interconnect" is generally defined as an information-carrying medium that establishes a communication pathway. The interconnect may be a wired interconnect, where the medium is a physical medium (e.g., electrical wire, optical fiber, cable, bus traces, etc.) or a wireless interconnect (e.g., air in combination with wireless signaling technology).

"Information" is defined as data, address, control or any combination thereof. For transmission, information may be transmitted as a message, namely a collection of bits in a predetermined format. One particular type of message is a frame including a header and a payload, each having a predetermined number of bits of information.

I. General Architecture

Referring to FIG. 1, an exemplary embodiment of a wireless network 100 having a centralized mechanism to manage the operations of and communications within wireless network 100 is illustrated. According to this embodiment of the invention, wireless network 100 is deployed as a wireless local area network (WLAN) that comprises one or more wireless network switches 110 (e.g., WLAN switch) in communication with one or more access points (APs) $130_1$-$130_N$ (where N≥1) over an interconnect 120. Interconnect 120 may be a wired or wireless information-carrying medium or even a mesh network for example. In addition, one or more wireless stations (STAs) $140_1$-$140_M$ (M≥1) are in communication with APs $130_1$-$130_N$ over wireless interconnects 150.

Figure 2:
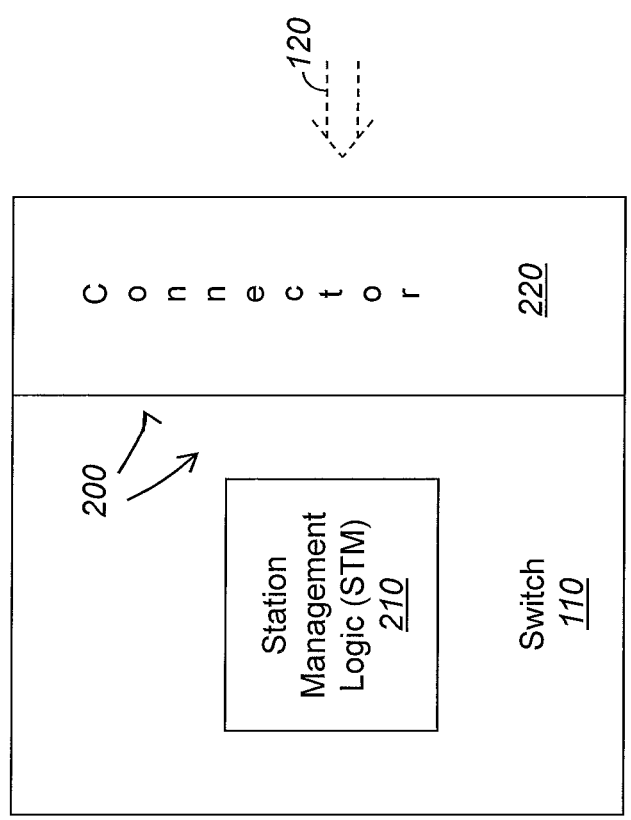
FIG. 2 is an exemplary embodiment of a wireless network switch of FIG. 1.

As shown in FIGS. 1 and 2, WLAN switch 110 comprises logic 200 that supports communications with APs $130_1$-$130_N$ over interconnect 120. Moreover, the wired network features resources that are available for users of wireless network 100. Such resources may include database or data storage servers.

WLAN switch 110 supports bi-directional communications by receiving messages from and transmitting messages to one or more targeted APs $130_1$,..., $130_N$ over interconnect 120. Interconnect 120 may be part of any type of private or public wired network, including but not limited or restricted to Ethernet, Token Ring, Asynchronous Transfer Mode (ATM), Internet or the like. The network communication protocol utilized over interconnect 120 may be selected from a variety of protocols, including TCP/IP.

More specifically, logic 200 of WLAN switch 110 comprises station management logic (STM) 210 and a wired or wireless connector 220. Connector 220 enables an exchange of information between a wired network and station management logic 210. For instance, connector 220 may provide coupling for a plurality of Ethernet interconnects, serial interconnects and the like to enable access with APs over a wired public or private network.

Herein, station management logic 210 processes information extracted from the wireless message. According to one embodiment of the invention, station management logic 210 is implemented as a processor executing a program, stored in memory, that is configured to provide centralized management involving security protection, load balancing, coverage hole detection, and broadcast/multicast traffic reduction of wireless network 100. Alternatively, station management logic 210 may be a state machine. Regardless of the chosen architectural implementation, in order to provide such centralized management, different information is received, extracted and processed as described below.

Referring back to FIG. 1, each AP $130_1$, ..., or $130_N$ supports bi-directional communications by receiving wireless messages from any or all of the STAs $140_1$-$140_M$ in its coverage area and transferring data from the messages over interconnect 120 to which WLAN switch 110 is coupled.

STA $140_1$ is adapted to communicate with and accesses information from any associated AP. For instance, STA $140_1$ is associated with AP $130_1$ and communicates over the air in accordance with a selected wireless communications protocol. Hence, AP $130_1$ generally operates as a transparent bridge connecting both wireless network 100 featuring STA $140_1$ with the wired network.

According to one embodiment, STA $140_1$ comprises a removable, wireless network interface card (NIC) that is separate from or employed within a wireless device that processes information (e.g., computer, personal digital assistant "PDA", telephone, alphanumeric pager, etc.). Normally, the NIC comprises a wireless transceiver, although it is contemplated that the NIC may feature only receive (RX) or transmit (TX) functionality such that only a receiver or transmitter is implemented.

II. General Centralized Management Operations

A. Security

Figure 3A:
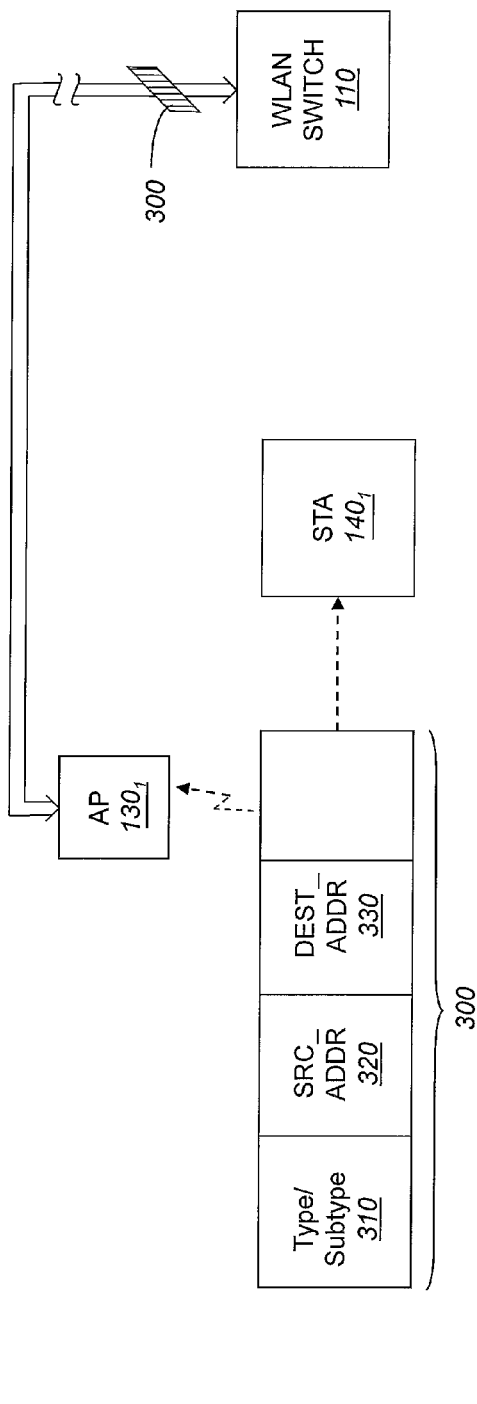
FIG. 3A is an exemplary embodiment of the wireless network switch operating in cooperation with an Access Point (AP) to respond to a security attack on a wireless station (STA) of the wireless network.

Referring now to FIG. 3A, an exemplary embodiment of a wireless network switch (e.g., WLAN switch 110) operating in cooperation with one or more access points (e.g., AP $130_1$) to respond to a security attack on a wireless station (STA $140_1$) is shown. One common security attack is a "man-in-the-middle" attack that involves an attacker assuming the identity of an AP or STA and sending DEAUTHENTICATION messages to the other. This disrupts communications between AP $130_1$ and STA $140_1$ so that the attacker can monitor ("sniff") for passwords and other information as communication is reestablished.

Since message headers (e.g., IEEE 802.11 headers) are not encrypted, the attacker can obtain Media Access Control (MAC) addresses for both AP $130_1$ and STA $140_1$. While it is easy to prevent a man-in-the-middle attack against AP $130_1$, it is difficult to prevent such attacks against STA $140_1$, which is beyond the control of AP $130_1$. Centralized station management deployed within WLAN switch 110 allows more effective solution to curtail the man-in-the-middle attack.

Herein, STA $140_1$ receives a DEAUTHENTICATION message 300 that impersonates origination from AP $130_1$. However, since STA $140_1$ is in the coverage area for AP $130_1$, AP $130_1$ detects DEAUTHENTICATION message 300 and forwarded the same to WLAN switch 110 for processing. Upon analysis of the type and subtype fields 310 of DEAUTHENTICATION message 300, WLAN switch 110 is able to determine that a DEAUTHENTICATION message has been received.

In particular, during normal operations, WLAN switch 110 is responsible for generating all valid DEAUTHENTICATION messages to STAs. Hence, according to one embodiment of the invention, station management software executed within WLAN switch 110 is able to immediately determine whether DEAUTHENTICATION message 300 is invalid through analysis of a source address (SRC_ADDR) 320 and/or destination address (DEST_ADDR) 330.

For instance, according to one embodiment of the invention, if DEST_ADDR 330 indicates that the STA 140$_1$ is the targeted device, but WLAN switch 110 has no record of generating DEAUTHENTICATION message 300, DEAUTHENTICATION message 300 is deemed invalid. Namely, DEST_ADDR 330 of DEAUTHENTICATION message 300 is compared to corresponding information from all valid DEAUTHENICATION messages recently transmitted from WLAN switch 110. Data associated with recent, valid DEAUTHENTICATION messages are stored within a table accessible by WLAN switch 110. If no match is detected, DEAUTHENTICATION message 300 is invalid. This causes WLAN switch 110 to block communications generated by STA 140$_1$ for associating with any AP 130$_1$, ... or 130$_N$.

Figure 3B:
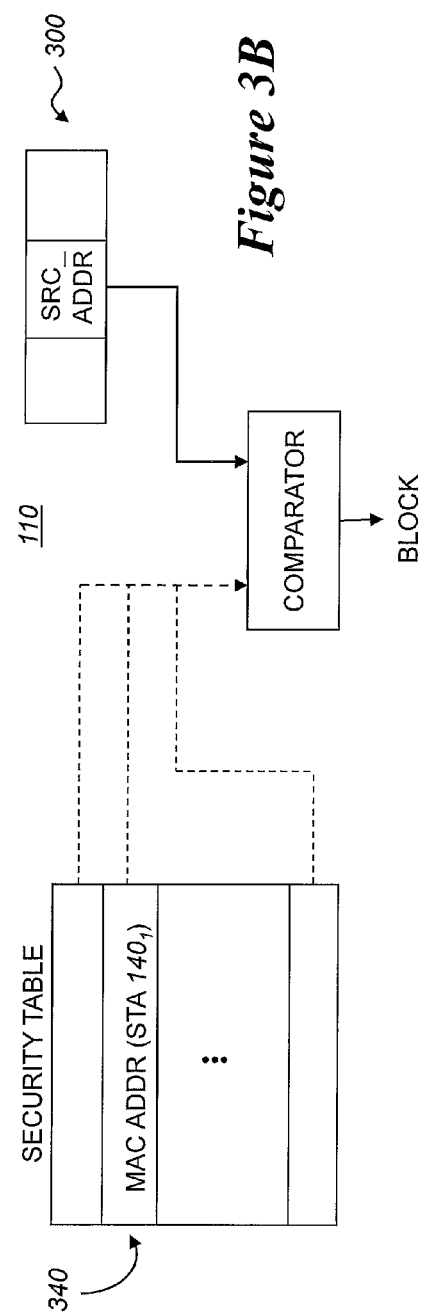
FIG. 3B is an exemplary embodiment of the operations of station management logic for a wireless network switch to block communications by a station under a security attack.

According to one embodiment of the invention, as shown in FIG. 3B, WLAN switch 110 places the MAC address of STA 140$_1$ into a security table 340. Thereafter, WLAN switch 110 sends a message to an AP (e.g., AP 130$_2$), to which STA 140$_1$ is currently associated, to disassociate itself from STA 140$_1$. Thereafter, upon receipt of any PROBE REQUEST, ASSOCIATION REQUEST or REASSOCIATION REQUEST messages transferred any AP 130$_1$, ... or 130$_N$ in wireless network 100, WLAN switch 110 accesses security table 340 to determine whether the station initiating the request message, such as STA 140$_1$, is blocked. This may be accomplished by comparison of the SRC_ADDR of the request message to contents of security table 340 as shown.

If the station initiating the request is blocked, the request message is denied. STA 140$_1$ may be precluded from freely communicating with any APs 130$_1$-130$_N$ of wireless network 100 for either (i) a prescribed time period, which may be static or programmable for each network, or (ii) an indefinite duration until the network administrator removes STA 140$_1$ from security table 340.

Figure 4:
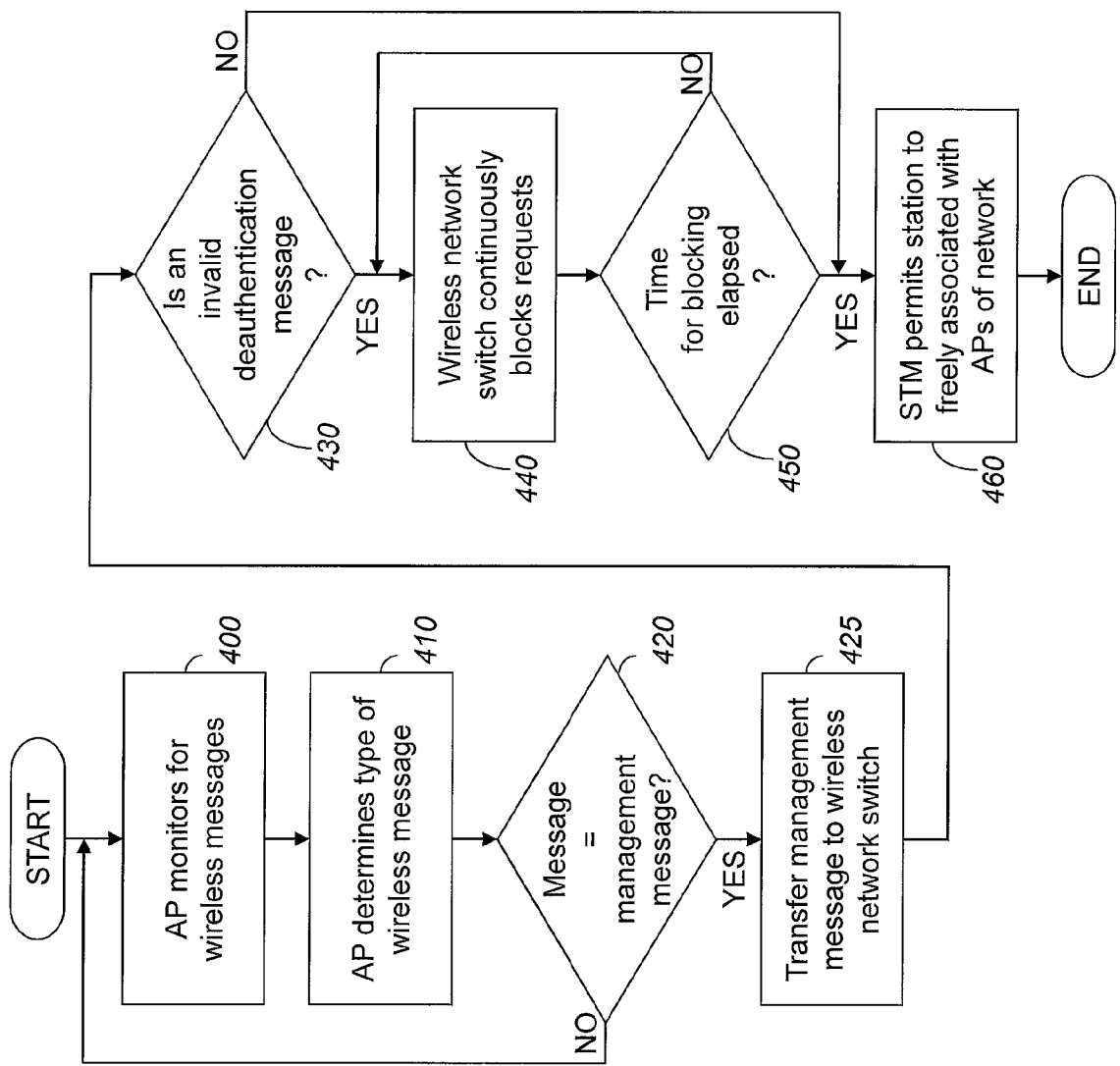
FIG. 4 is an exemplary embodiment of a method of operation of the wireless network switch responding to a security attack.

Referring to FIG. 4, an exemplary embodiment of a method of operation of a wireless network switch, such as a WLAN switch for example, responding to a security attack is shown. First, within its coverage area, an AP monitors the airwaves within its coverage area for broadcast, multicast and addressed wireless messages (item 400). For each received wireless message, the AP determines the particular type of wireless message received (item 410). This is accomplished by analyzing a message (or frame) type field in the header of the message. Upon determining a detected wireless message is a management message, such as a DEAUTHENTICATION message for example, the AP forwards the DEAUTHENTICATION message to the station management logic of the wireless network switch (items 420 and 425).

During normal operations, the station management logic generates all valid DEAUTHENTICATION messages to STAs. Upon receipt of the DEAUTHENTICATION message, which has been generated by a device other than the wireless network switch, the station management logic knows that a targeted STA is being attacked by reviewing of the DEST_ADDR of DEAUTHENTICATION message with records of recently generated DEAUTHENTICATION messages for example (item 430). This causes the station management logic to continuously block requests made by the targeted STA (item 440). These requests include a PROBE REQUEST, an ASSOCIATION REQUEST, a REASSOCIATION REQUEST and the like.

According to one embodiment of the invention, requests from the targeted STA are blocked by the station management logic monitoring for management messages from the targeted STA (e.g., analyzing source address of a PROBE REQUEST, ASSOCIATION REQUEST, or REASSOCIATION REQUEST). Upon discovery, station management logic generates a message to the AP to deny such request.

After it is no longer necessary to block requests from the targeted STA, the targeted STA is permitted by the station management logic to freely associate with any AP (blocks 450 and 460). Such blocking may be lifted by the station management logic if (1) the network administrator manually clears the targeted STA from a block list, or (2) a prescribed time period for blocking requests by STA has elapsed. The prescribed time may automatically elapse if based on a policy rule established by the network administrator.

B. Load Balancing

Figure 5:
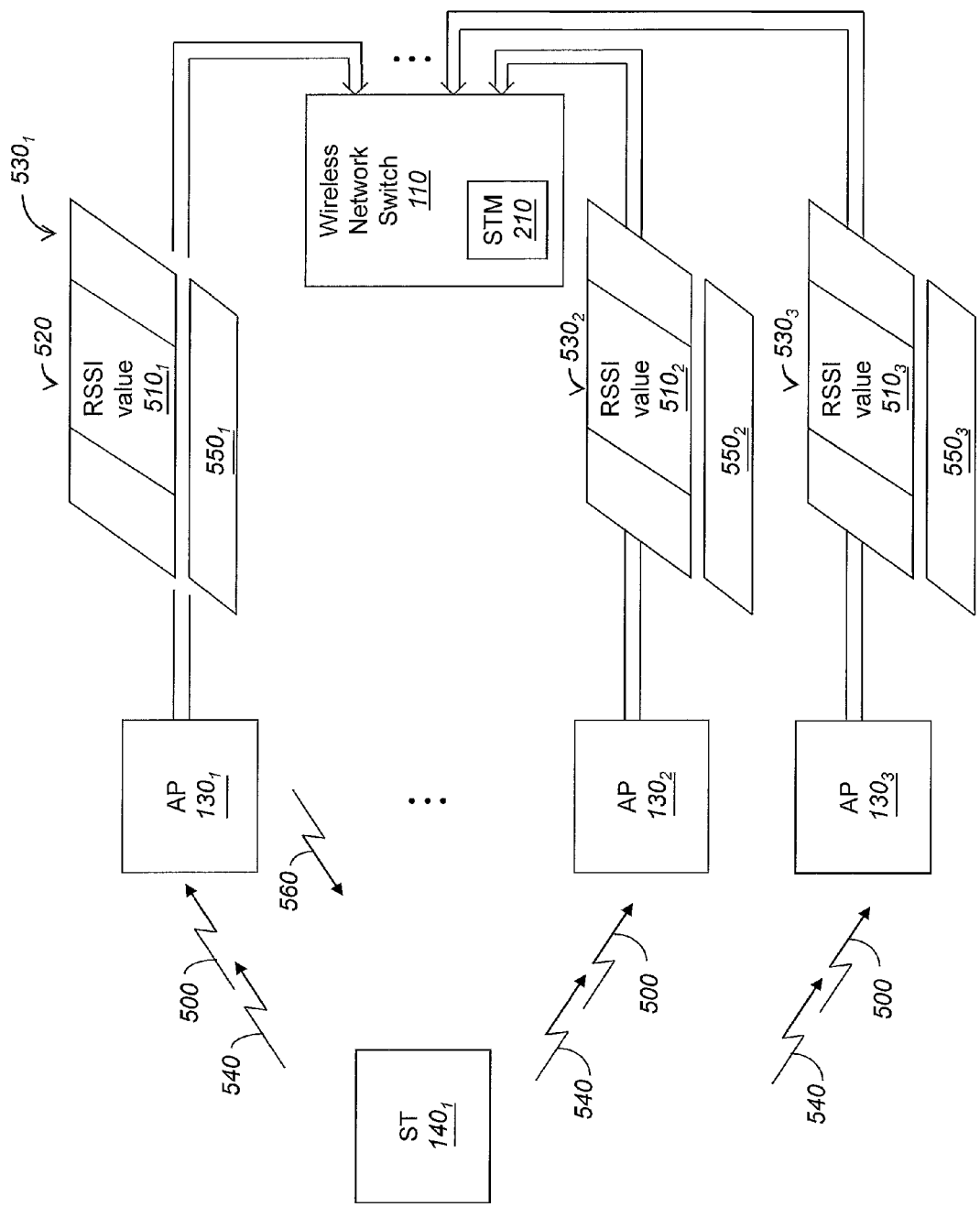
FIG. 5 is an exemplary embodiment of the wireless network switch operating in cooperation with a wireless station (STA) for centralized load balancing for the wireless network.

Referring now to FIG. 5, an exemplary embodiment of wireless network switch 110 operating in cooperation with one or more access points (e.g., AP 130$_1$, AP 130$_2$, AP 130$_3$) and a wireless station (STA 140$_1$) attempting to associate with one of the APs 130$_1$-130$_3$ is shown. In particular, station management logic 210 of wireless network switch 110 provides centralized control in steering STA 140$_1$ to a suitable AP during the Association phase.

STA 140$_1$ is configured to associate with an AP through passive scanning (beacons) or active scanning. "Active scanning" involves STA 140$_1$ broadcasting a PROBE REQUEST message 500 to all APs capable of receiving the request on multiple channels. For this embodiment, APs 130$_1$-130$_3$ receive a first PROBE REQUEST message 500. However, instead of each AP 130$_1$-130$_3$ returning a response to STA 140$_1$, first PROBE REQUEST message 500 is altered and subsequently routed to station management logic 210.

More specifically, upon receipt of first PROBE REQUEST message 500, each AP 130$_1$-130$_3$ measures the received signal strength for first PROBE REQUEST message 500 and generates a corresponding received signal strength indicator (RSSI) value 510$_1$-510$_3$. At each AP 130$_1$-130$_3$, the RSSI value 510$_1$-510$_3$ is loaded into a field 520 of first PROBE REQUEST 500 (e.g., Duration ID field) to produce modified Probe Requests 530$_1$-530$_3$, respectively. Thereafter, modified Probe Request messages 530$_1$-530$_3$ are transferred to station management logic 210 from AP 130$_1$-130$_3$, respectively. At this time, station management logic (STM) 210 does not respond to modified Probe Request messages 530$_1$-530$_3$, but rather awaits a second set of Probe Request messages 550$_1$-550$_3$ or modified versions thereof.

As shown, in response to a second PROBE REQUEST message 540, AP 130$_1$-130$_3$ collectively route the second set of Probe Request messages 550$_1$-550$_3$ to station management logic 210. It is contemplated that Probe Request messages 550$_1$-550$_3$ may be modified to include the newly measured RSSI value. However, if the time duration between first PROBE REQUEST 500 and second PROBE REQUEST message 540 is nominal (e.g., a few milliseconds), modified Probe Request messages 550$_1$-550$_3$ need not include an updated RSSI value.

It is contemplated that additional parameters, such as (i) number of users on AP 130$_1$-130$_3$ or (ii) percentage of bandwidth utilization by AP 130$_1$-130$_3$ for example, may be monitored by the AP themselves and periodically transferred to wireless network switch 110. In this type of embodiment, the values of these parameters may be contained in fields of the first or second set of modified Probe Request messages 530$_1$-530$_3$ or 550$_1$-550$_3$, respectively. However, the number of users on AP 130$_1$-130$_3$ and/or the percentage of bandwidth utilization by AP $130_1$-$130_3$ may be monitored by wireless network switch 110 internally, where load balancing is activated when maximum or minimum thresholds are exceeded.

At this time, STM 210 analyzes the RSSI values and/or load on each AP, and responds to second PROBE REQUEST message 540 on behalf of the AP $130_1$, . . . , or $130_3$ selected to associate with STA $140_1$ (e.g., AP $130_1$). This allows STM 210 to steer STA $140_1$ to a suitable AP based on instantaneous load and proximity. Moreover, by ignoring an initial PROBE REQUEST by STA $140_1$, this centralized Request/Response processing allows overloaded APs and/or APs remotely located from the STA to be hidden during the Association phase.

After PROBE RESPONSE message 560 has been received, STA $140_1$ starts the authentication and associate exchanges with the selected AP $130_1$. Thereafter, communications are established between STA $140_1$ and AP $130_1$.

Figure 6:
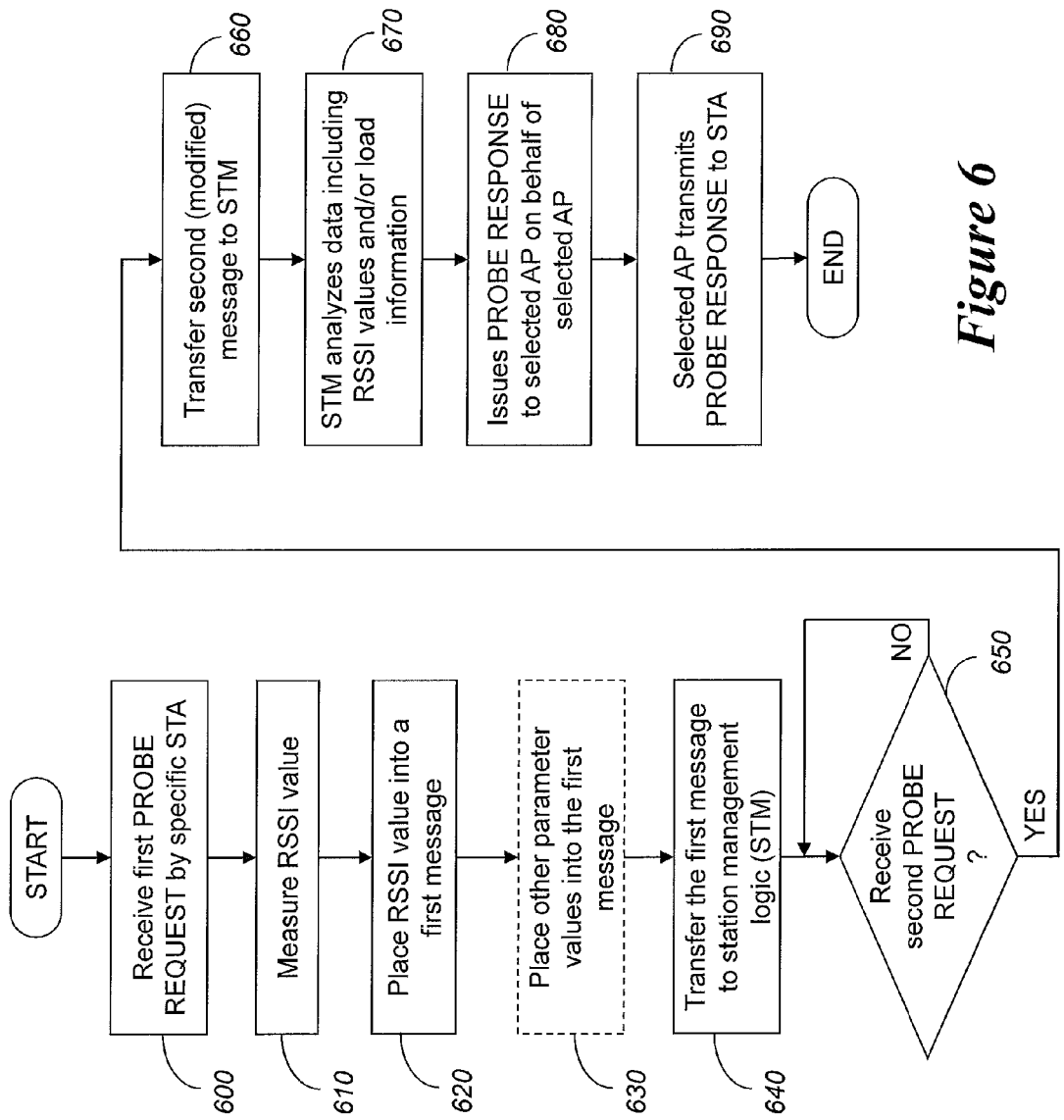
FIG. 6 is an exemplary embodiment of a method of operation of the wireless network switch for load balancing.

FIG. 6 is an exemplary embodiment of a method of operation of the wireless network switch for load balancing during an initial communication session. For this embodiment of the invention, STA sends a PROBE REQUEST message in an attempt to associate with an AP (item 600). The PROBE REQUEST message is usually sent to a broadcast address so that multiple APs can receive the PROBE REQUEST message. Upon receipt, each AP computes the RSSI value for the received PROBE REQUEST message (item 610). The RSSI value may be placed in an unused field of the PROBE REQUEST message for transfer to the STM (item 620). Of course, as shown as an optional operation in item 630, other parameter values may be placed in unused field(s) of the PROBE REQUEST message such as load on the AP (e.g., number of users, percentage of bandwidth utilized, etc.). Thereafter, the modified PROBE REQUEST messages are transferred to the STM of the wireless network switch (item 640).

Alternatively, in lieu of sending modified versions of the received PROBE REQUEST message as described above, each AP may be configured to send a message other than a modified PROBE REQUEST message. This message would be inclusive of the RSSI value and only selected information from the received PROBE REQUEST message. For instance, the selected information may include (i) a code to identify that the message is a PROBE REQUEST message, (ii) an address of the STA generating the PROBE REQUEST message, (iii) load of the AP, etc.

Upon receipt of messages from the APs, generated in response to receipt of the PROBE REQUEST, the STM does not respond, but rather awaits a second set of messages produced in response to another (second) PROBE REQUEST message generated by the STA when the previous (first) PROBE REQUEST message was not responded to (items 650 and 660). The second set of messages may be modified PROBE REQUEST messages including newly measured RSSI value and/or load information). However, if the time duration between the first PROBE REQUEST message and second PROBE REQUEST message is nominal (e.g., a few milliseconds), the second set of messages may be identical to the subsequent (second) PROBE REQUEST message or may be modified to include other information needed to determine the optimal AP to associate with the STA.

After receipt of the second set of messages, the STM analyzes the RSSI values and/or load on each AP, and responds to second PROBE REQUEST message on behalf of the AP selected to associate with STA (items 670, 680 and 690). By the station management logic hiding overloaded APs and/or APs remotely located from the STA during the Association phase, the overall wireless traffic is substantially reduced.

C. Coverage Hole Detection

Figure 7:
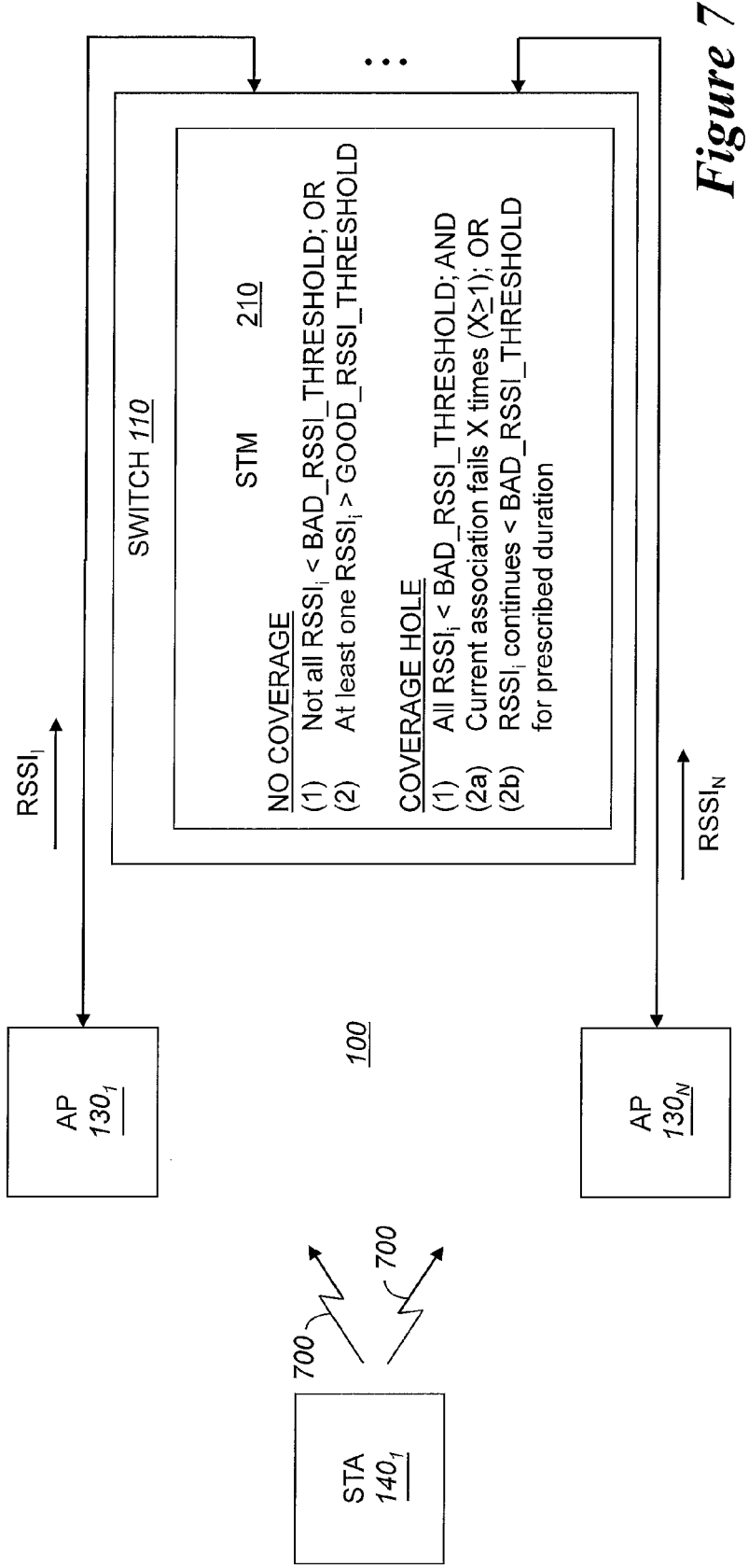
FIG. 7 is an exemplary embodiment of a wireless network switch operating in cooperation with an Access Point (AP) to detect coverage holes over a site.

Referring now to FIG. 7, an exemplary embodiment of a wireless network switch operating in cooperation with an Access Point (AP) to detect coverage holes over a wireless network 100 is shown. A "coverage hole" is a location where a STA cannot associate with any AP. Centralized station management logic allows for the wireless network to discover coverage holes and to automatically perform events to eliminate or substantially reduce discovered coverage holes. Examples of such events include, but are not limited or restricted to (1) increasing transmission power for selected APs or (2) notifying a network administrator regarding the coverage hole.

As shown in FIG. 7, wireless network 100 comprises wireless network switch 110, one or more access points (e.g., AP $130_1$, . . . , AP $130_N$) and one or more wireless stations (e.g., STA $140_1$). Station management logic (STM) 210, implemented within wireless network switch 110, provides centralized control for management messages received from each AP $130_1$-$130_N$ during an Association phase with STA $140_1$. In particular, each AP $130_1$-$130_N$ measures the RSSI value for a received management frame 700 and provides the RSSI value to STM 210.

According to this embodiment, two RSSI thresholds are used to determine the presence of a coverage hole. These thresholds may be static in nature (e.g., set in one-time programmable memory of wireless network switch 110) or may be dynamic in nature (e.g., set by a network administrator in memory of wireless network switch 110). A first RSSI threshold (referred to as "Good_RSSI_Threshold") indicates that STA $140_1$ is not in a coverage hole if any AP $130_1$, . . . , or $130_N$ detects an RSSI value more than Good_RSSI_Threshold for any message from STA $140_1$. A second RSSI threshold (referred to as "Bad_RSSI_Threshold") indicates that that STA $140_1$ may be in a coverage hole if all APs $130_1$-$130_N$ detect an RSSI value below Bad_RSSI_Threshold during message broadcasts from STA $140_1$ during the Association phase. As illustrative examples, Good_RSSI_Threshold may be set to approximately 20 dbm0 while Bad_RSSI_Threshold may be set to approximately 10 dbm0.

In summary, during the Association phase, wireless communications by STA $140_1$ are monitored. If none of APs $130_1$-$130_N$ detects an RSSI value for a management message above Bad_RSSI_Threshold, STM 210 adds STA $140_1$ to a potential coverage hole list. Thereafter, if STA $140_1$ either fails to complete association with an AP or consistently provides messages with RSSI values below Bad_RSSI_Threshold to the associated AP, STA $140_1$ is determined to be in a coverage hole. Namely, the placement of STA $140_1$ within an entry of the potential coverage hole list causes STM 210 to perform events to mitigate or eliminate the potential coverage hole.

Upon receiving a management frame, which originates from STA $140_1$ and indicates an RSSI value above Good_RSSI_Threshold, STM 210 removes STA $140_1$ from an entry of the potential coverage hole list.

Figure 8:
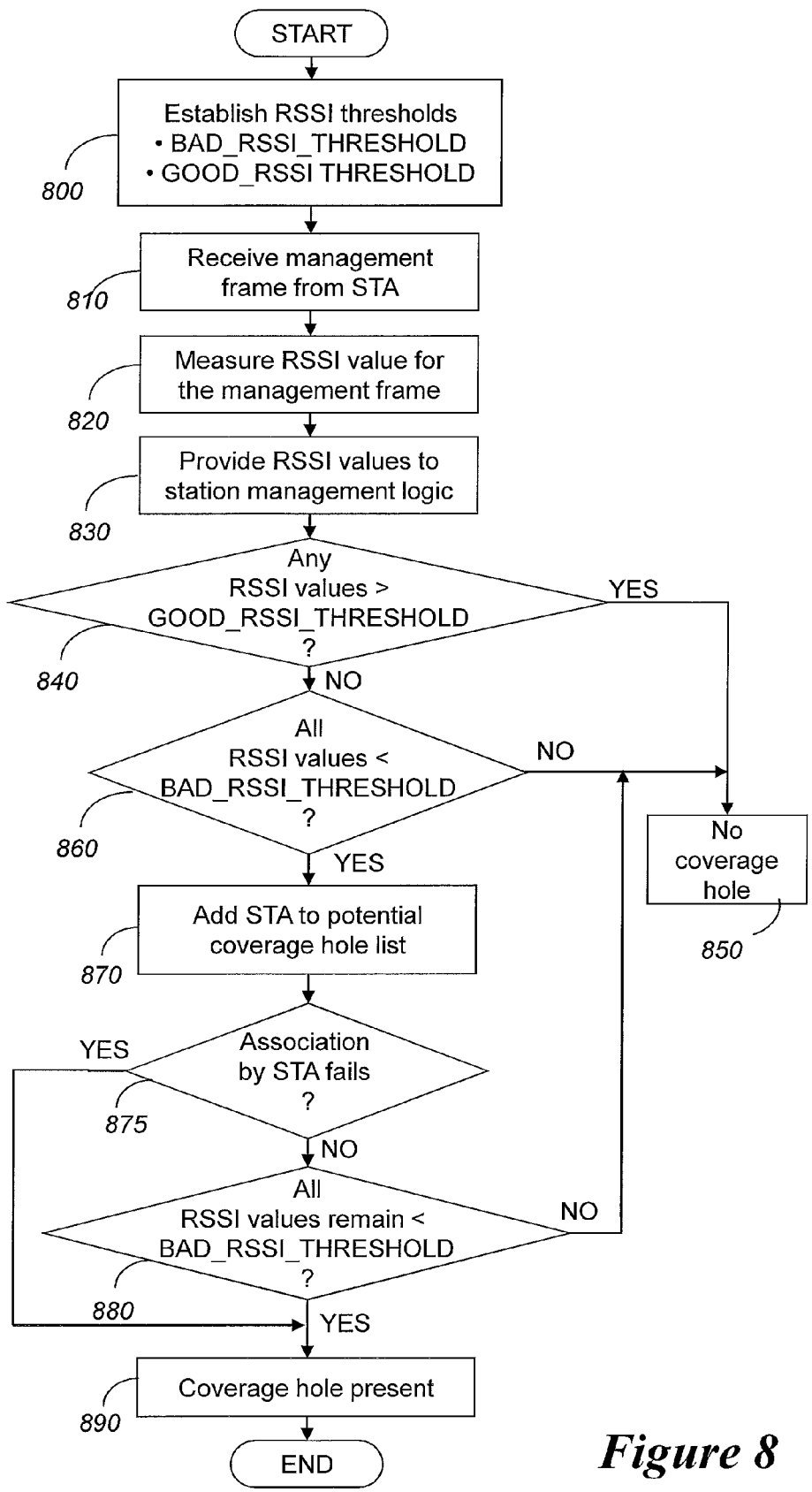
FIG. 8 is an exemplary embodiment of a method of operation of the wireless network switch for detecting coverage holes.

Referring to FIG. 8, an exemplary embodiment of a method of operation of the wireless network switch for detecting coverage holes is shown. Initially, a plurality of RSSI thresholds are established (item 800). These "thresholds," namely Good_RSSI_Threshold and Bad_RSSI_Threshold, are used to determine the presence of a coverage hole. Upon receipt of broadcasted management frames from the monitored STA, each AP measures the RSSI value for the management frame and provides the RSSI value to the station management logic "STM" (items 810, 820 and 830). Based on the RSSI values from the APs, the STM determines whether any of these RSSI values are greater than Good_RSSI_Threshold (item 840). If so, there is no coverage hole at the location of the monitored STA (item 850).

Furthermore, based on the RSSI values from the APs, the station management logic determines whether all of the APs detect an RSSI value below Bad_RSSI_Threshold (item 860). If so, the station management logic adds the monitored STA to a potential coverage hole list (item 870). Thereafter, if the monitored STA either fails to complete association with an AP or consistently provides messages with RSSI values below Bad_RSSI_Threshold to the associated AP, the monitored STA is determined to be in a coverage hole (items 875 and 880). This causes the station management logic to initiate events to mitigate or eliminate such coverage holes (item 890).

D. Broadcast & Multicast Traffic Reduction

Figure 9:
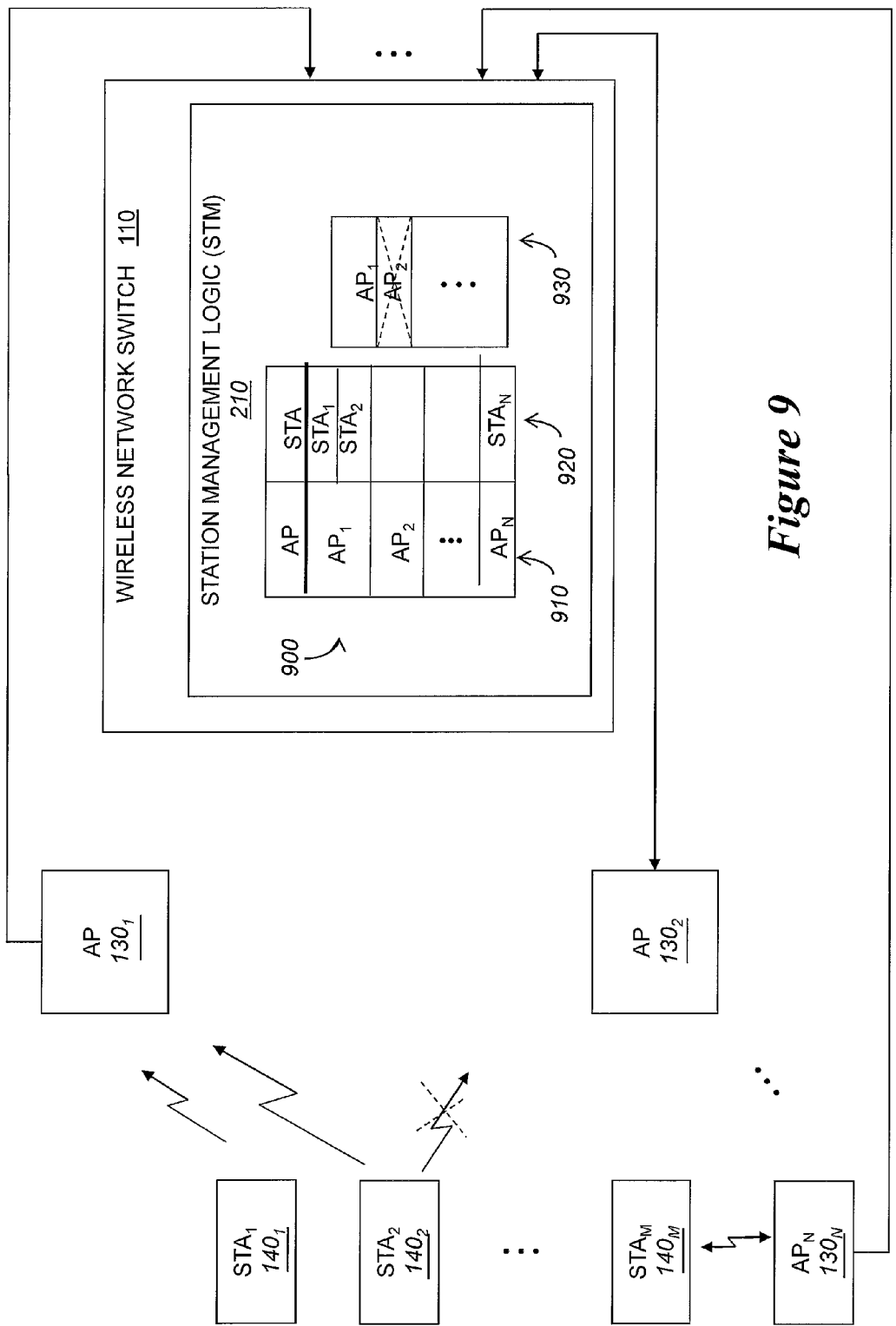
FIG. 9 is an exemplary embodiment of a method of operation of the wireless network switch for limiting broadcast and/or multicast traffic over an Access Point (AP).

Referring to FIG. 9, an exemplary embodiment of a method of operation of the wireless network switch for limiting broadcast and/or multicast traffic over an AP is shown. Herein, station management logic (STM) 210 has knowledge of all STAs $140_1$-$140_M$ associated with all APs $130_1$-$130_N$ in wireless network 100. Namely, STM 210 maintains an AP-STA table 900 to identify which STAs are associated with which APs. According to one embodiment, AP-STA table 900 comprises MAC addresses 910 for APs $130_1$-$130_N$ and MAC addresses 920 of STAs $140_1$, ... , and/or 140 associated with each AP $130_1$, ... , or $130_N$.

According to one embodiment of the invention, after a STA associates or disassociates with an AP, AP-STA table 900 is updated. Herein, the MAC address for the newly associated STA is added to AP-STA table 900 after the Association phase has completed. Likewise, a newly disassociated STA is removed from AP-STA table 900.

In addition, after an update, STM 210 determines whether an AP (e.g., AP $130_2$) now has no STAs associated therewith. If so, STM 210 removes the MAC address of AP $130_2$ from a multicast group list 930 stored within wireless network switch 110. Since multicast group list 930 is accessed by wireless network switch 110 to determine the targeted destinations for multicast and broadcast transmissions, AP $130_2$ would discontinue sending any broadcast or multicast messages until at least one STA becomes associated with AP $130_2$. Once a STA becomes associated with AP $130_2$, STM 210 adds the MAC address of AP $130_2$ back to multicast group list 930.

E. RF Neighborhood Detection

Figure 10:
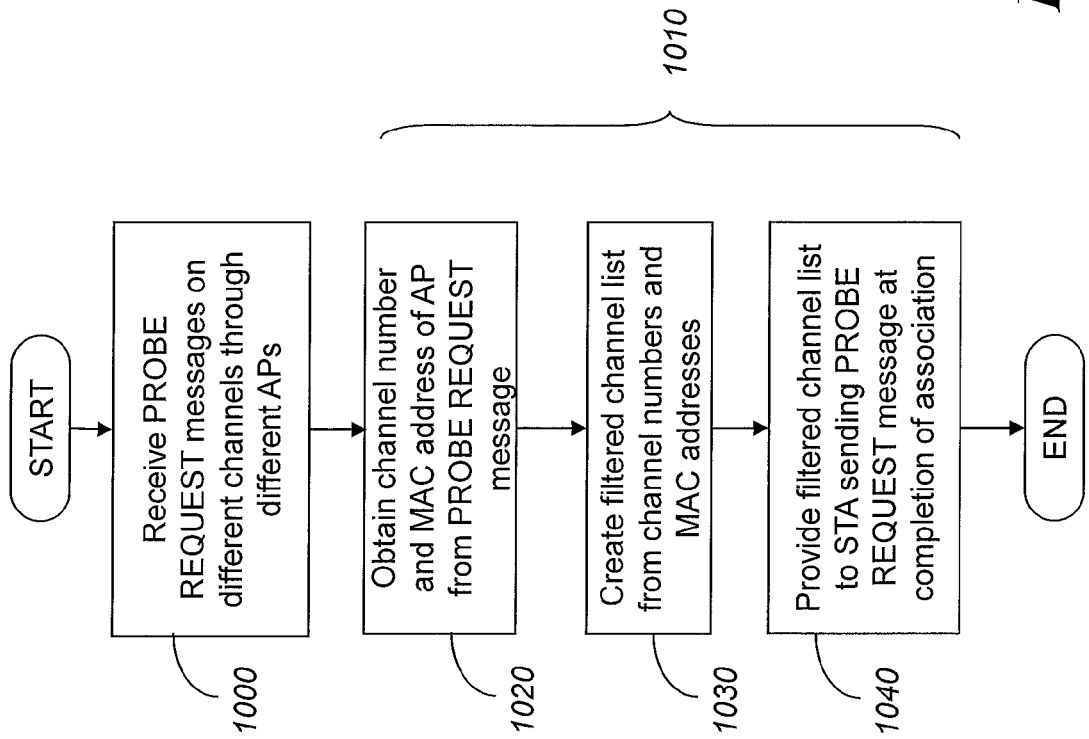
FIG. 10 is an exemplary embodiment of a method of operation of the wireless network switch for RF neighborhood detection.

Referring to FIG. 10, an exemplary embodiment of a method of operation of the wireless network switch for RF neighborhood detection is shown. According to one embodiment of the invention, a wireless network switch receives PROBE REQUEST messages on different channels through different APs (1000). These PROBE REQUEST messages originate from the same STA.

Upon receipt, the wireless network switch dynamically computes RF neighborhoods of all APs deployed (1010).

According to one embodiment of the invention, a channel number and a MAC address associated with the AP is included as information within the PROBE REQUEST message (1020). The wireless network switch creates a filtered channel list, which includes the MAC address of the AP and channel number extracted from PROBE REQUEST messages (1030). The filtered channel list is provided to the STA at completion of its association, such as in an ASSOCIATION RESPONSE message for example (1040). This enables the STA to use this filtered channel list to make more efficient mobility decision in future associations.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A non-transitory computer readable medium comprising instructions which, when executed by one or more hardware processors, causes performance of operations comprising:
   receiving, by a plurality of access points from a single station, a plurality of request messages on a respective plurality of communication channels;
   extracting a plurality of channel identifiers from the plurality of request messages received, by the plurality of access points from the single station, on the respective plurality of communication channels;
   generating a filtered list based on the plurality of channel identifiers extracted from the plurality of request messages received, by the plurality of access points from a single station, on the respective plurality of communication channels; and
   transmitting, by a network device, the filtered list to the single station.

2. The medium of claim 1, wherein the operations further comprise:
   extracting a plurality of access point identifiers from the plurality of request messages, wherein the filtered list includes the plurality of access point identifiers.

3. The medium of claim 1, wherein the operations further comprise:
   transmitting the filtered list to the single station in response to a completion of an association phase between the single station and a respective access point.

4. The medium of claim 1, wherein the operations further comprise:
   transmitting the filtered list to the single station in response to the single station receiving a probe response.

5. The medium of claim 3, wherein the filtered list identifies a plurality of radio frequency neighbors of the respective access point to facilitate the single station to make a mobility decision in a subsequent association phase.

6. The medium of claim 1, wherein the operations further comprise:
   dynamically determining a radio frequency neighborhood of the plurality of access points.

7. The medium of claim 6, wherein the radio frequency neighborhood of the plurality of access points is determined in response to the plurality of access points receiving the plurality of request messages.

8. The medium of claim 1, wherein the request message comprises one or more of: a probe request, an association request, an authentication request, and a re-association request.

9. The medium of claim 1, wherein the channel identifiers comprise a channel number and/or a channel frequency.

10. The medium of claim 1, wherein the operations are performed by an access point identified by an access point identifier.

11. A system comprising:
    at least one network device comprising memory and a processor;
    receiving, by a plurality of access points from a single station, a plurality of request messages on a respective plurality of communication channels;
    extracting a plurality of channel identifiers from the plurality of request messages received, by the plurality of access points from the single station, on the respective plurality of communication channels;

generating a filtered list based on the plurality of channel identifiers extracted from the plurality of request messages received, by the plurality of access points from a single station, on the respective plurality of communication channels; and transmitting, by the at least one network device, the filtered list to the single station.

12. The system of claim 11, wherein the operations further comprise extracting a plurality of access point identifiers from the plurality of request messages, wherein the filtered list includes the plurality of access point identifiers.

13. The system of claim 11, wherein the operations further comprise transmitting the filtered list to the single station in response to a completion of an association phase between the single station and a respective access point.

14. The system of claim 13, wherein the operations further comprise transmitting the filtered list to the single station in response to the single station receiving a probe response.

15. The system of claim 13, wherein the filtered list identifies a plurality of radio frequency neighbors of the respective access point to facilitate the single station to make a mobility decision in a subsequent association phase.

16. The system of claim 11, wherein the operations further comprise:
dynamically determining a radio frequency neighborhood of the plurality of access points.

17. The system of claim 16, wherein the radio frequency neighborhood of the plurality of access points is determined in response to the plurality of access points receiving the plurality of request messages.

18. The system of claim 11, wherein the request message comprises one or more of: a probe request, an association request, an authentication request, and a re-association request.

19. The system of claim 11, wherein the channel identifier comprises a channel number and/or a channel frequency.

20. The system of claim 11, wherein the at least one network device comprises an access point identified by an access point identifier.

21. A method comprising:
receiving, by a plurality of access points from a single station, a plurality of request messages on a respective plurality of communication channels;

extracting a plurality of channel identifiers from the plurality of request messages received, by the plurality of access points from the single station, on the respective plurality of communication channels;

generating a filtered list based on the plurality of channel identifiers extracted from the plurality of request messages received, by the plurality of access points from a single station, on the respective plurality of communication channels; and transmitting, by a network device, the filtered list to the single station.

* * * * *